Aug. 5, 1969        E. B. DANE, JR        3,459,617
METHOD FOR CONSTRUCTING A BOAT HULL
Original Filed Sept. 4, 1964        4 Sheets-Sheet 2
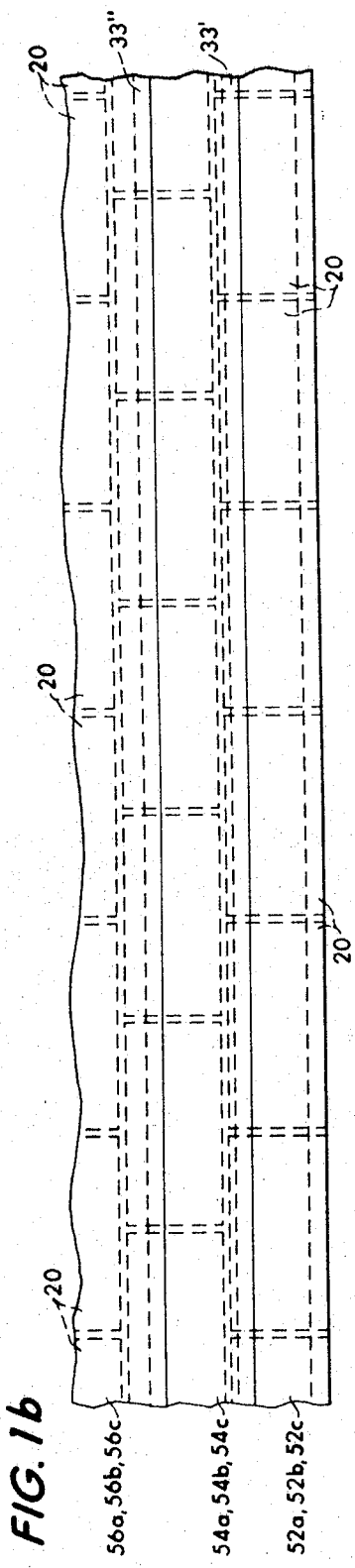
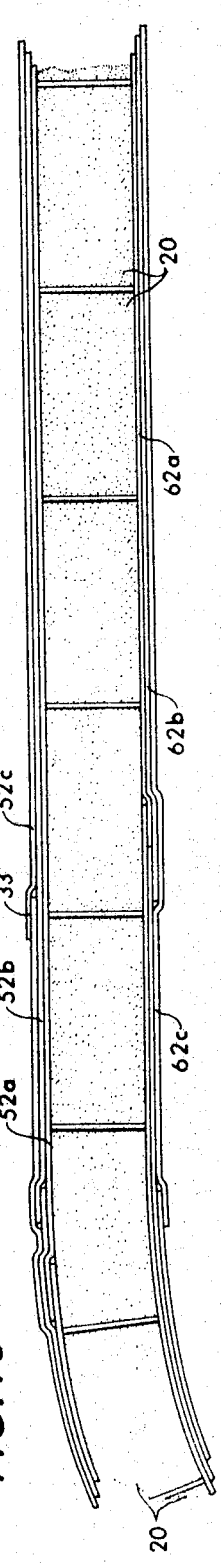
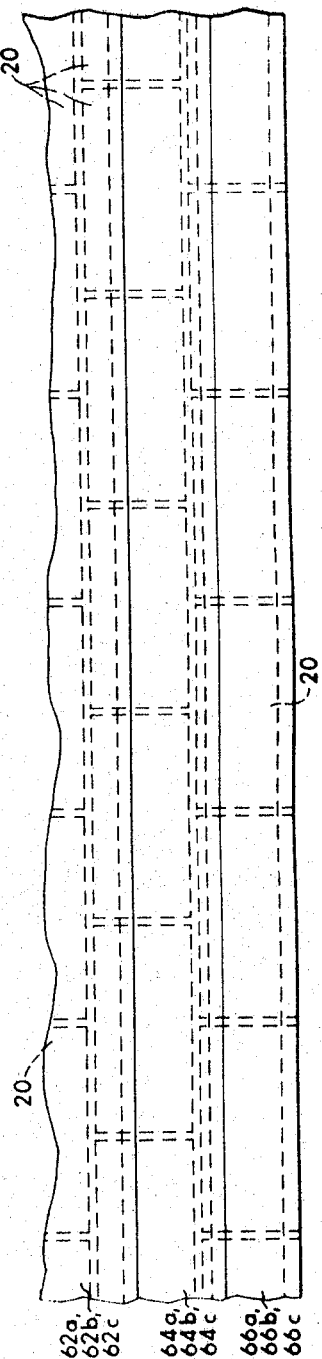
INVENTOR
ERNEST B. DANE, JR.
BY
Joseph J. Abrahim Jr.
ATTORNEY Aug. 5, 1969  E. B. DANE, JR  3,459,617
METHOD FOR CONSTRUCTING A BOAT HULL
Original Filed Sept. 4, 1964  4 Sheets-Sheet 4

INVENTOR
ERNEST B. DANE, JR.

BY
Joseph J. Alekshun Jr.
ATTORNEY

United States Patent Office 3,459,617
Patented Aug. 5, 1969

3,459,617
METHOD FOR CONSTRUCTING A BOAT HULL
Ernest B. Dane, Jr., 57 Tyler Road,
Belmont, Mass. 02178
Original application Sept. 4, 1964, Ser. No. 394,419, now Patent No. 3,268,924, dated Aug. 30, 1966. Divided and this application Feb. 23, 1965, Ser. No. 440,985
Int. Cl. B29c 27/22; B32b 15/04
U.S. Cl. 156—212                                    5 Claims

ABSTRACT OF THE DISCLOSURE

A method for making a sandwiched structural surface on a coarse mold. A substantially continuous layer of foam plastic blocks is lightly tacked on the mold, higher density blocks being placed in areas where extra strength is sought. The external surfaces of the blocks are rasped until they form the desired curvature, and then an external skin is laid by bonding one or more layers of overlapping thin metallic strips to the blocks. The mold is removed and an internal skin of overlapping thin metallic strips is laid on the internal surfaces of the blocks in the same manner.

---

Figure 1:
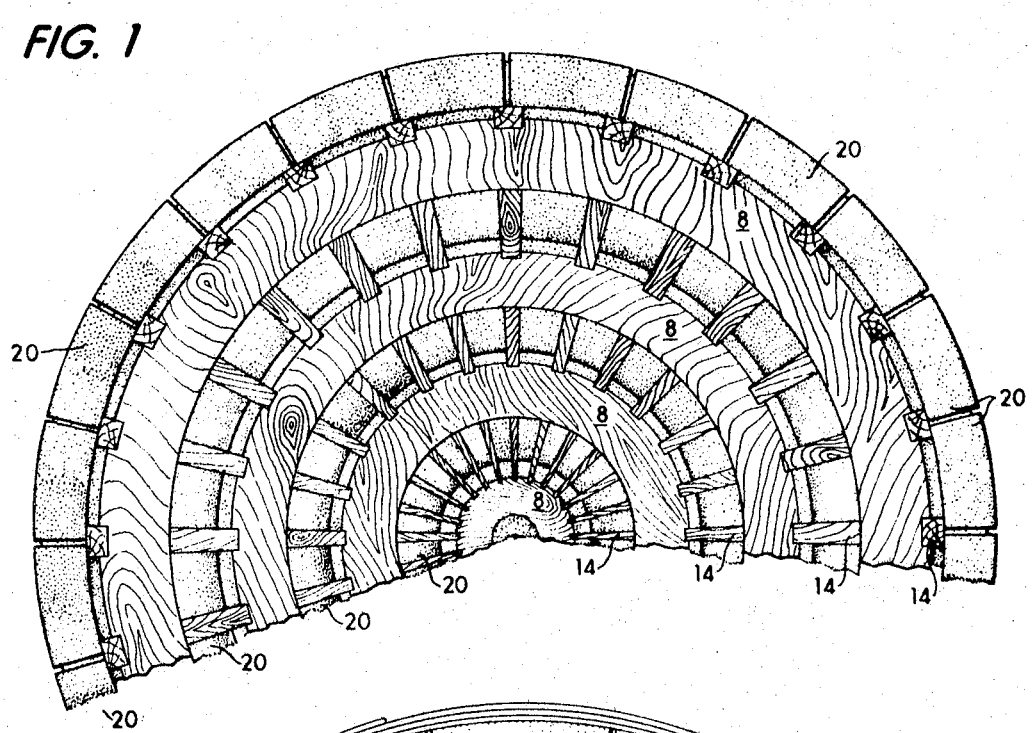

This application is a division of copending application Ser. No. 394,419 filed Sept. 4, 1964 which issued as Patent No. 3,268,924.

This invention relates generally to structural surfaces and particularly to a variant sandwiched structure and a construction method useful in making vehicles, especially boats having doubly curved surfaces.

Because of their comparative advantages over single layered surfaces, sandwiched surfaces or skins are preferred for the body structure of some vehicles, such as boats, private airplanes and custom built automobiles. A sandwiched skin embodies an inexpensive low density core bonded between a pair of high density, relatively thin but strong surfaces. Typically, plastic foam or honeycomb material is used as the core and the bounding surfaces are made of fiber glass or metal. The core mechanically stabilizes the surfaces and prevents shear between them. Thus, a sandwiched skin places strong material on the outside where strength is needed and the weaker material on the inside where there is less loading. It features a stiff and strong structure with low ratios of weight-to-stiffness and weight-to-strength. A sandwiched skin also demonstrates favorable damping characteristics which reduces noise.

Sandwiched skins may be manufactured in a number of ways. However, they generally prove difficult and expensive to make when surfaces with compound curves or shapes are attempted. For example, one sandwiched structure proposed for doubly curved surfaces comprises a continuous cellular core bounded by skin layers consisting of metallic strips adhesively secured in overlapping or shingled relation to one another. Since the core is continuous, the mold, upon which it is fitted prior to the laying of the skins, must have exacting contours if the concave surface is to assume the desired shape. This structure would be appropriate where a concave surface must comply with precise design specifications, such as in the design of high resolution radar reflectors. However, because of the necessity of an elaborate mold, it doesn't offer the most economical approach in applications where reduced surface accuracy is acceptable.

With aim towards avoiding elaborate molds, a reinforced fiber glass sandwiched structure using hollow interlocking panels as a core has been introduced. This construction begins with the laying of a plurality of rectangular shaped hollow panels against a simple wooden frame. The panels are composed of extruded fiber glass and are shaped on the sides to permit hinging of adjacent panels. To smooth the core surface, grooves between panels are later covered with filler. Inner and outer skins composed one or more layers of fiber glass cloth reinforced plastic are then secured to the core. It should be pointed out, that although the need for a well defined mold is alleviated, the individual panels are composed of expensive fiber glass material and must be appropriately shaped on the sides to allow socketing. As the rectangular panels form a substantially continuous core this approach is not well suited for the construction of compoundly curved surfaces. Because of the anisotropic properties of the fiber glass planks, the described structure also compromises surface strength. Moreover, as a substantial amount of dense fiber glass is used in the core and especially around the socket shaped sides, it has the added disadvantage of being heavy.

Various techniques are available for constructing other kinds of sandwiched skins, such as those using contacting solid rectangular wooden planks in their cores. Wooden cores, however, are susceptible to shrinking and swelling. Requiring careful fitting they are also expensive to manufacture. Cores formed by injecting expandable resinous materials between preformed panels recently have gained wide attention. But these are only suited for mass production due to the extremely costly dies required in preforming the panels. Furthermore, as the resinous material is homogenous extra strength core material cannot be distributed to areas where needed.

In view of the forementioned limitations of general structural surfaces used in vehicles and particularly those in boats, and the shortcomings of corresponding construction methods, applicant has as the broad object of his invention to provide an improved means and method for making doubly curved surfaces.

A specific object of this invention is to provide an improved means and method for constructing a stiff, strong, light and low noise structural surface particularly suited for vehicles.

Another object of this invention is to provide an improved method for fabricating a surface skin on a coarse an inexpensive mold.

Another object of this invention is to provide an improved method for constructing a doubly curved structure on an inexpensive mold and having a light, insulating core with strong and stiff surfaces.

Another specific object of this invention is to provide an improved method and means for fabricating a boat hull having favorable bouyant characteristics.

Another specific object of this invention is to provide and improved method and means for making a boat that is essentially noiseless.

Another specific object of this invention is to provide an improved method for building a boat having rigid internal structural supporting members.

It is another object of the invention to provide a method for constructing boats with compound surfaces at a moderate cost.

Figure 1A:
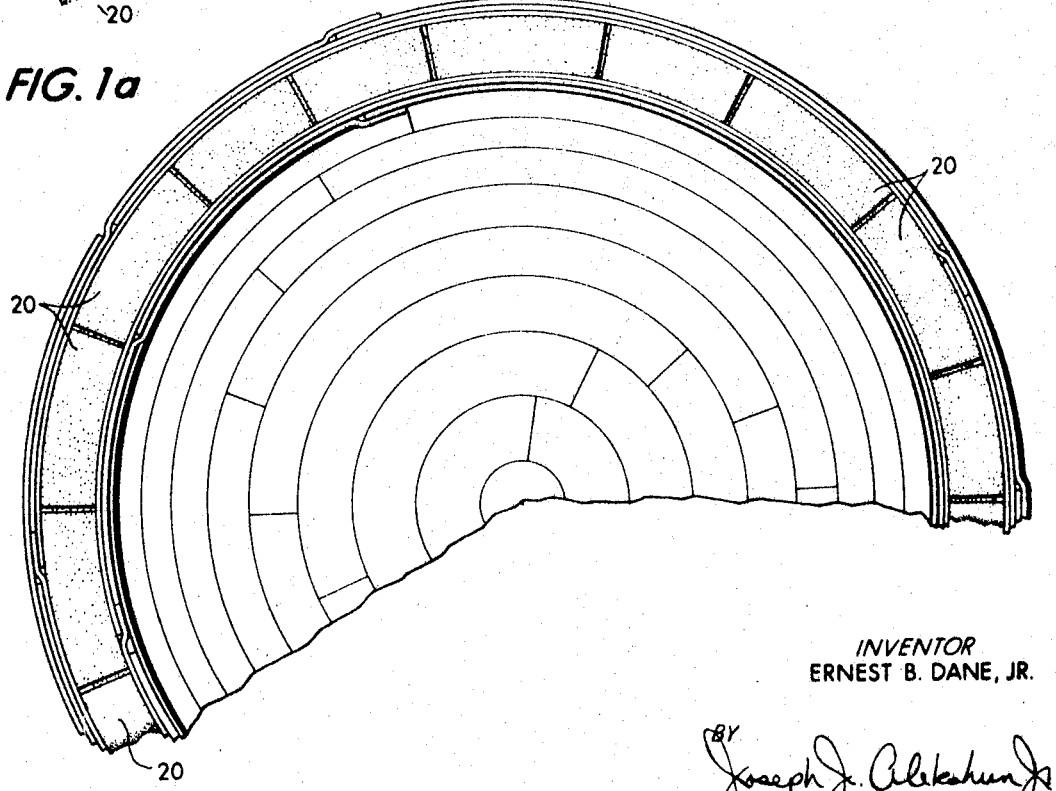
Figure 2:
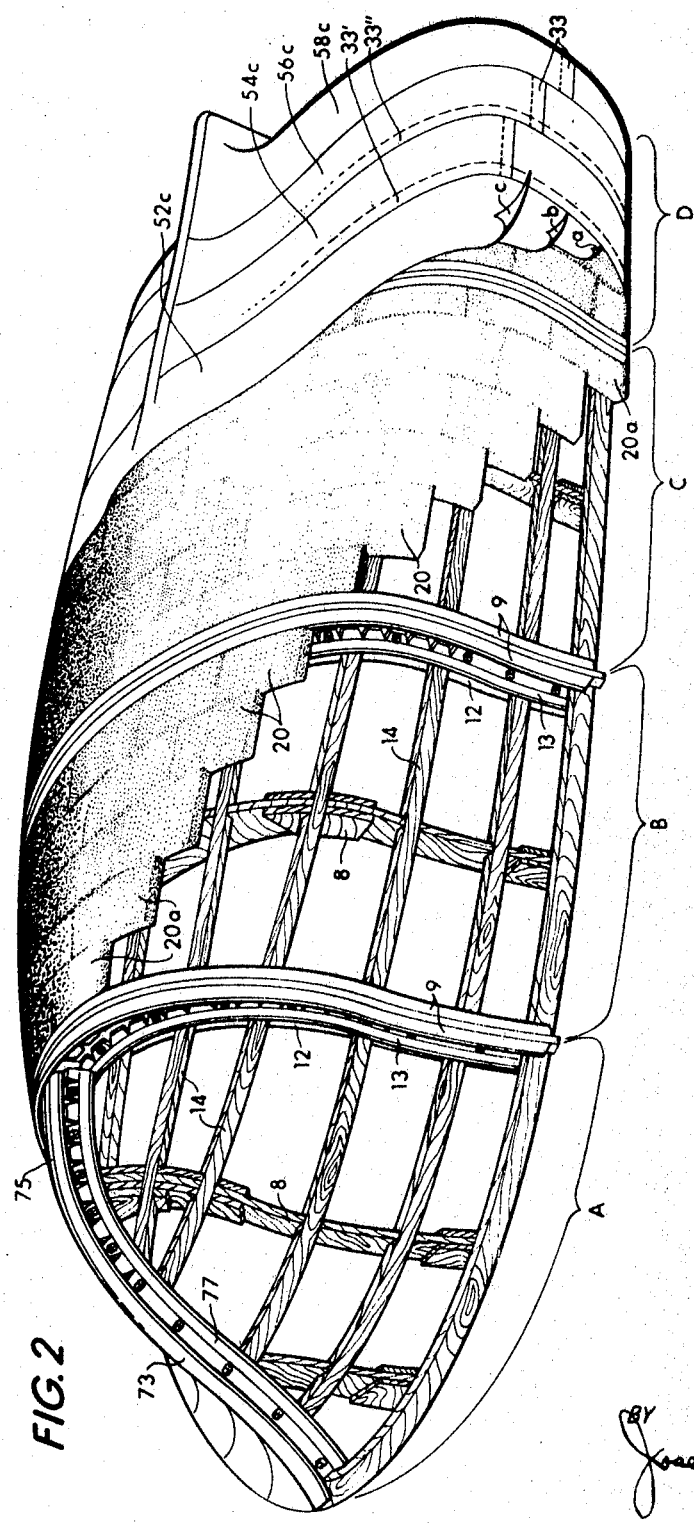
Figure 2A:
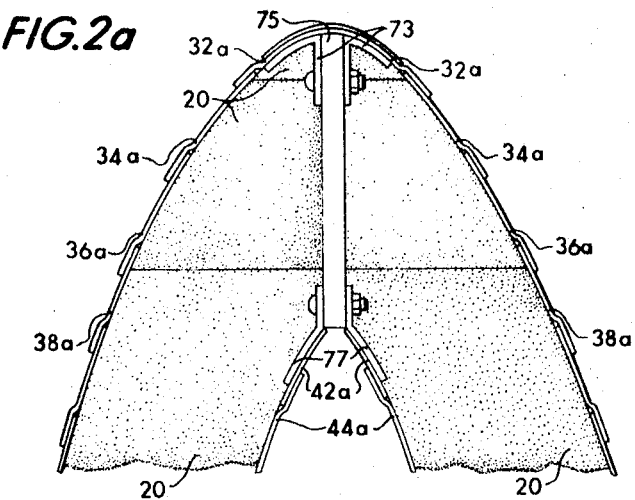
Figure 2B:
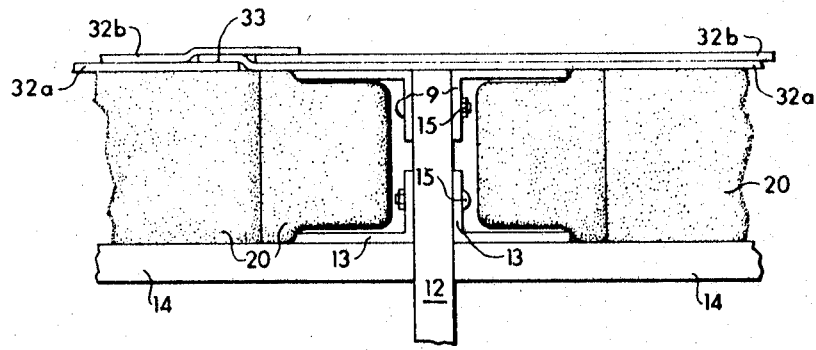

These and other objects are met by a variant sandwiched structure composed of individually shaped foam plastic blocks bounded by inner and outer skins made of thin metallic strips. In accordance with the method of construction, a substantially continuous layer of foam plastic blocks is lightly tacked to a coarse inverted mold of the kind used in planked wooden boat construction. Higher density blocks are applied to areas where special strength is needed. Once in place, the outside faces of the blocks are rasped or sanded to the desired curvature. Next the external skin is fabricated by bonding one or more layers of overlapping thin metallic strips to the shaped blocks, heavier strips similarly applied to areas of special strength. Each strip is thin enough to easily follow the definition of the blocks, and narrow enough to avoid a compound curvature within any one strip. Skins are fabricated one layer at a time, each layer being bonded to the preceding one by a non-shrinking cement. Upon completion of the external skin, the entire structure is turned upright and the mold removed. Next, the internal skin, likewise fabricated of overlapping metal strips, is built one layer at a time to the desired thickness. Structurally supporting members, such as the bulkheads, webs and transoms in boats, are rigidly fastened to both inner and outer skins. Preferably, they are built into the original mold and bonded to the outer skin as it is laid. When the mold is removed these members remain with the skin. The resulting sandwiched structural surface features a low weight-to-strength ratio, a high strength and stiffness factor, and is virtually noiseless. The method allows the construction of doubly curved structural surfaces on coarsely defined molds at moderate cost and is particularly useful in boat construction. These and other features of the present invention will be apparent from the following detailed description taken in conjunction with the following drawings of which:

FIG. 1 illustrates the mold and core block arrangement used to initiate construction of a spherically curved sandwiched structure, FIG. 1A is a cross sectional view of a completed spherically curved structure built in accordance with the invention, FIG. 1C is a detailed illustration of a portion of the structure of FIG. 1A, FIG. 1B is a top view of the structure of FIG. 1C, FIG. 1D is a bottom view of the structure of FIG. 1C, FIG. 2 illustrates the construction of a typical boat hull in accordance with the invention, FIG. 2A is a detailed view of the stem section of the hull of FIG. 2, and FIG. 2B illustrates the interface between structurally supporting members and the skins for the hull of FIG. 2.

FIGS. 1, 1A, 1B, 1C and 1D illustrates the broad concept of the invention embodied in a spherically curved surface. As illustrated in FIG. 1 a number of blocks 20 are lightly tacked on a coarse inverted mold of the kind used in wooden boat construction; that is, a mold made of a series of transverse sawn wood frames 8 connected by laterally spaced longitudinal ribbands 14. Blocks 20, which bridge the gaps in the mold, are composed of light and relatively rigid material that can be easily worked by rasping, filing, or sanding. Foam plastic or honeycomb are preferred core materials because they have good mechanical characteristics and cut easier than the proverbial cheese. Blocks 20 are initially oversized to allow shaping, but otherwise need not be of any particular configuration. However, wedge shaped ones are helpful in sharply curved areas. Pins, staples, tape, contact cement, double headed concrete nails or the like may be used for tacking, as the only requirement is the ability to separate the mold and the blocks upon roll-over.

When all in place, blocks 20 are filed, sanded, or rasped until the outline of the blocks takes on the desired shape. Upon being cleaned of plastic dust they are ready to receive the outer skin. The outer skin consists of one or more layers of very thin metallic strips, the strips in each layer in overlapping relation with one another and forming a continuous and quite smooth surface. More specifically, FIGS. 1B and 1C show details in the construction of a three layer outer skin. The first layer is formed of strips 52a, 54a, and 56a, the second layer of strips 52b, 54b, 56b and the final strips 52c, 54c and 56c. To accentuate features of construction, the thickness of the metal sheets in each strip is greatly exaggerated and individual sheets are shorter than they would be on an actual surface. Successive sheets of each strip are overlapped and permanently bonded at the ends 33 and edges. It is essential to the fabrication of a strong skin that proper regard be given in overlapping the edges of all adjacent strips; for instance, the overlap 33' between the foremost edge of strip 54c and the back edge of strip 52c or the overlap 33" between strips 54c and 56c etc. The amount of overlapping in the edges should be aimed at equalizing the shear strength of the cement with the tensile strength of the metal so the strength of edge joints is substantially constant in any direction. As a guide, a well cemented lap of ¾" has a shear strength essentially equal to the tensile strength of the more common low cost metals of .006" thickness. Alternatively, the strips may be overlapped to the extent of one-half of their width whereby each layer forms a uniform outer surface by itself. This alternate arrangement has the added advantage that the register of successive layers is less critical.

Each sheet is thin enough to easily follow the block faces and sufficiently narrow to avoid a compound curve within any one sheet. Except for high strength areas, a thickness .006" usually proves convenient. A width of 6" is suitable for flat areas, whereas, proportionately narrower sheets are applicable where the curvature is comparatively sharp. Lengthwise, sheets either extend clear across the structure or are as long as the curve permits. Styron, or non-shrinking catalyst polymerizing cements such as the epoxies, or other cements that similarly do not depend on solvent evaporation, serve as suitable cementing agents.

To enhance surface smoothness, skin layers are fabricated one at a time. Consequently, once strip 52a is formed, adjoining strips 54a, 56a . . . etc., in the first layer are subsequently bonded to the blocks, the successive sheets in each strip having overlapping ends. The work progresses along the longitudinal axis of the mold until the first layer skin is complete. Next the second layer skin is built beginning with strips 52b, 54b, 56b, . . . etc., these strips being cemented to underlying strips of the first layer. Again, the work progresses down the mold until the second layer is completely installed. Work then extends to the third layer starting with strips 52c, 54c, 56c.

After the outer skin is completed the entire structure is rolled upright, the mold removed, and the inner skin constructed in the same way. Illustrated in FIGS. 1C and 1D, first inner layer skin, beginning with strips 62a, 64a and 66a, cemented to the inner faces of the blocks with similar lap jointing of successive ends and edges. Subsequently, second and third layers of inner skin, initiated by strips 62b, 64b, 66b and 62c, 64c, 66c respectively, are applied one layer at a time. When fabrication is complete, the up-righted structural surface appears as shown in FIG. 1A.

Skins may be laid by machine or, where only a few surfaces are to be built, more simply by hand. Where a machine is used applicant suggests it carry the coil of stock, spray or spread cement, and have a roller to press the strip down tight. The spray may either mix the epoxy, its catalyst and hardener outside the nozzle, or may use a solution already mixed and carried in a tank. Additionally, it may need a finger to trace the edge of the preceding strip and to guide shearing rolls that will trim the edges of the next strip to be fit, if such trimming proves necessary. Other suggested implements would include a revolving wire brush to better clean the surfaces of the strips, and a cleaning tank with articulation to allow the tank to remain upright while the main unit follows curves in the hull. The machine should be mounted on wheels for manuverability and should be supported by an overhead crane with a counterweight to relieve the operator's load.

BOAT CONSTRUCTION

Construction of mold

The above described method may be specifically applied to the construction of boats. Consistent with the invention, four sections of a boat hull are shown in FIG. 2 in differing stages of development. Construction begins with the fabrication of an inexpensive inverted mold composed of sawed wooden frames 8, serially disposed along and transversing the longitudinal axis of the hull. The frames are interconnected by ribbands 14 that terminate at the stem and stern sections of the mold. Structurally supporting members 12, such as floor supporting webs or bulkheads are of non-swelling material and a poor conductor of heat, such as pregwood or marine grade wood. Preferably, they are built into the original mold. A first series of joined pairs of metallic unequal legged angles 9 are installed along the periphery of such members to serve as an interface between each member and outer skin. The longer and protruding leg has a flat section that receives the initial layer of the outer skin. A second series of angle pairs 13 are installed just inside the periphery for connection with the inner skin. As shown in FIG. 2B, the gap between opposing pairs of angles 13 and 9 is just enough to allow fitting of a foam plastic block between flats, and to allow the top of the flats to lie flush with the remainder of the block. Angle pairs are mutually connected to the member by bolt 15.

Illustrated in FIGS. 2 and 2A, arcuate heavy central plate 75 built into the mold, supports the stem section of the hull. A series of forward and back edge angles 73 and 77, respectively, are disposed on each side along the length of the plate. The flats of the forward angles form a V-shaped channel with each side of the plate and the flats of rear angles form an obtuse angle with each side thereof. The angles are light enough to enable handworking of the flats to the proper bevel. Alternatively, tabs could be cut into the two edges of the plate and then stretched to form the angular section. In either event, there is enough protruding flat area in the forward and rear edges of plate 75 to support the initial layers of the inner and outer skins.

Fitting of blocks

When the mold is completed, foam plastic blocks 20 are lightly tacked to the ribbands in the manner previously described in connection with FIG. 1. Blocks around supporting members are shaped and snugly fitted between the flats of opposing angles. FIG. 2B specifically shows how the blocks are fitted between the flats of angles of support member 12. FIG. 2A illustrates how blocks 20 are fitted between the flats of the angles in the stem. After blocks around the stem, bulkheads and floor supporting webs are in place, blocks are tacked to the ribbands covering the remaining portions of the hull as shown in section *c* of FIG. 2. Higher density blocks 20a are used in areas requiring increased strength. For example, extra core strength is needed at the rail in order that the deck can be rigidly secured along the periphery. Accordingly, a rim of higher density block 20a is fastened to the mold at deck level. Also, additional strength is required all along the keel, under chain plates and at any openings in the hull. Solid wood could be used, but a more workable core for these areas is a block of dense foam plastic. After tacking, the outer faces of all blocks are rasped until the combined contour assumes the shape desired of the hull. When rasping is completed some sanding may be required to level the edges of the blocks and to otherwise develop an even surface for receiving metal strips. The surface should be cleaned perhaps with a vacuum cleaner, to remove block dust and any other foreign matter that would weaken the bond with the outer skin.

Outer skin

Long metallic strips .006″ thick and 6″ wide are next layed across the blocks. They may be laid longitudinally, or transversely as shown in Section D of FIG. 2. It is expected that strips covering some of the more curved sections, such as the stem sections, will have to be tapered to permit a uniform fit. Ends and edges of successive strips are overlapped in accordance with FIG. 1C.

Laying of the skins preferably begins near the center of the hull where side and bottom are most nearly parallel with the center line. Lay up then proceeds towards the stem and stern sections in either order, the individual metal strips extending from port to starboard. FIG. 2A shows how foremost strips 32a, 34a, 36a . . ., which must be tapered to smoothly follow the curve, are cemented to the flats of angles 73 and to blocks 20 in the stem section. FIG. 2 shows final strips 54c, 56c, and 58c of the thirds of three layers *a, b, c* of the exterior skin applied to the stern. While laying the skin a press roller should be employed to force each strip down on the cement and simultaneously drive out any air bubbles. After the first layer skin is finished the small strip between abutting edges of successive strips may have to be filled with epoxy to smooth the surface. The first layer completed, the second layer is next laid, construction again starting at the point of maximum beam. This layer extends from port to starboard and otherwise conforms with FIGS. 1B and 1C. Likewise, the strips in the second layer are pressed to improve bonding and epoxy filler possibly used to smooth the final surface. The layers are thusly fabricated one at a time until the outer skin attains the necessary thickness.

Except for areas requiring extra strength, metallic sheets having a thickness of .006″ should provide ample tensile strength. In areas where the skin must be stronger, for instance along the rail, around the keel and chain plates, thicker sheets are used. These may be integrated into the skin and without causing bulge in the surface by initially sanding or cutting a sufficient depression into the supporting dense core blocks 20a to offset the combined additional thickness of the sheets.

Inner skin

When laying of the outer skin is concluded the entire structure is rolled over and the mold removed. If structurally supporting members were originally built into the mold they will hold their shape well enough, and subsequently frames and ribbands are easily removed. Starting again near the center section, the inner skin is identically laid. As shown in FIG. 2A, at the stem first strips 42a, 44a, 46a of the initial inner layer are cemented to inner angles 77 and blocks 20. As construction goes on, the first layer becomes continuous being interrupted only around bulkhead and web members. There strips of the initial layer are mutually joined to the flats of angles 13 and the adjacent blocks snugly fitted around the protruding member. The inner skin is built from port to starboard one layer at a time and a roller employed to improve the cement bond.

Transom

The transom may be fabricated of the same kind of sandwiched section having a number of fitted foam plastic blocks between inner and outer metallic skins. Broader and thicker strips can be used or even single sheets, as this section has simple curves. Strong filler is inserted around the edges where the inner skin of the transom joins the cross section of the aft portion of the hull. The filler increases the shear stiffness of the joint. Also, a few V-shaped strips mutually cemented to the corner-most strips of the inner skin of the hull and transom improves strength. Where the curvature is appreciable, short strips provide a more suitable fit. The junction is otherwise strengthened by angle sections distributed along the corner. The outer skin at the junction is developed by bending the corner strips and integrating the initial and additional layers into the corresponding skin layers of the transom and hull. In other words, this portion of the outer skin is fabricated along with the rest of the outer surface of the hull, except the corner-most strips are bent to follow and cover the junction.

Floor timbers

Floor timbers to support ballast, keels, engine beds, etc., are formed as I or box beams with a lower flange composed of a heavier metal strap just inside the outer skin, a web of pregwood, fiber glass plastic or metal, and an upper flange of a metal strap just below the cabin sole. Over the part of the bottom where floors are fitted, the curved skin is laid between them, and cemented to angles bolted to the webs; or if the design is not too deep, the space between floors can be filled with foam plastic and the inner skin run over the top of the upper flanges. Some empty space should be left along the center line to catch water that would otherwise be trapped above the cabin sole. This space must be then lined, and then must be accessible to pumping equipment.

Decks

Decks are made of the same light sandwich construction as the sides, or less expensively, of marine grade plywood with fiber glass covering. At the edges the periphery of the deck is screwed and cemented to one rim strip of dense plastic material. If the outer skin is composed of athwartship strips, they can be left long enough to lap over the deck and cemented under a covering board. A triangular section strip of extra foam might be fitted inside the dense strip at the rail, so that the inner skin could swing inboard to form a diagonal brace before being cemented to the under side of the deck. This foam must be added after removal of the mold but before the inner skin is in place.

Chain plates need cover considerable area of both inner and outer skin in order that the cement and bolts have a good hold. Four strips of SS on each skin of a thickness sufficient to give the required strength when brought out together at the top and fanned out over the inner skins below might do. The hole for the pin is drilled after assembly of the plate.

Suitable metal for boat skins

The alloy Titanium 6Al4Va is a first choice, for it is light (.161 lb./cu. in. Sp. Gr. 4.43) strong (120,000 p.s.i. YS) and highly corrosion resistant. However, it may be much too expensive for such large structures. Alternatively, aluminum alloy 5083 H34 (.096 lb./cu. in., 39,000 p.s.i. YS) can be used for the inside plies. The same alloy Marten Hardcoated, can be used for outside plies, provided it can be economically purchased. If Marten Hardcoated alloy is too expensive, an outer layer of 316 stainless steel, perhaps .002" thick would suffice. Well cemented to .040" to .060" of aluminum, it is quite resistant to tearing. Any tears that do occur need prompt attention, however, as the large difference in electrolyte potential causes rapid attack on the aluminum. The titanium alloy would make a very good outermost layer. A fiber glass exterior also is possible. It would contribute very little to the strength, and could be heavier than the others, but probably gives the best protection against corrosion. Flake glass is another possibility as is ribbon glass, which might even be used in place of the metal strips for the entire skin.

While particular embodiments of the invention have been described it should, of course, be understood that it is not to be so limited. Modifications may be made and yet remain within the intended scope of the invention.

For instance, in the construction of the boat structurally supporting members were described as being constructed into the mold. This need not be the case, as they may be added after removal of the mold. An alternative would be to apply wide blocks of wood or very dense core material during block lay up to areas that will underlie structurally supporting members. Continuous inner and outer skins will then cover these blocks after the two skins have been applied. Upon removal of the mold structurally supporting members are inserted over the denser blocks and secured thereto by screw fastenings which protrude through the inner skin and into the blocks. It should be pointed out, moreover, that other or core material, metals, or even non-metallic isotropic sheet material, other than of the kind described, may be incorporated and still be within the spirit of the invention. Also, the core may take long foam plastic planks arranged side by side, instead of blocks, and these may be beveled into shape by machine or hand when the contour of the structure is formed. Finally, although the metal strips have been shown in the drawings as transversing the longitudinal axis of the mold, they could be laid longitudinally or diagonally if these skin configurations prove more convenient.

Because of these and other possible modifications it is therefore comprehended, by the appended claims, to cover any such modifications falling within the true spirit and scope of the invention.

What is claimed is:

1. A method for constructing a sandwiched metallic structural surface using foam plastic blocks against a coarse mold comprising the steps of:
    (a) lightly fastening a second face of each of said foam plastic blocks to said mold,
    (b) rasping the opposing first face of each block so that the combined outline of said opposite faces of said blocks approximates the contour desired of said structural surface,
    (c) cementing at least one layer of overlapping metal strips to said first faces of said blocks,
    (d) removing said mold, and
    (e) cementing at least one layer of overlapping metal strips to said second faces of said blocks.

2. A method for constructing a boat hull against an inverted mold comprising wooden frames transversing the longitudinal axis of said hull and ribbands extending across said frames along the length of said mold, comprising the steps of:
    (a) lightly fastening the second face of a plurality of foam plastic blocks to the ribbands of said mold,
    (b) rasping the opposing first faces of said blocks so that the combined outline of said first faces of said blocks substantially forms the contour desired of said hull,
    (c) cementing at least one layer of overlapping metal strips to said first faces of said blocks,
    (d) removing said mold, and
    (e) cementing at least one layer of overlapping metal strips to said second faces of said blocks.

3. A method for constructing a boat hull using a coarse inverted mold comprising non-permanent portions including wooden frames and ribbands that interconnect said frames along the longitudinal axis of said mold, and comprising permanent portions that remain with said hull including bulkheads, web frames transversing said longitudinal axis of said mold and a central plate in the stem section of said mold, said method comprising the steps of:
    (a) attaching a first series of pairs of metallic angles along the bottom periphery and a second series of pairs of metallic angles just inside the bottom periphery of said bulkheads and webs, said first and second series of angles having flats extending outward from said bulkheads and webs,
    (b) attaching a third series of metallic angles on each side of the forward edge of said plate, the flats of said third series of angles forming V-shaped channels with each side of said plate, and attaching a fourth series of metallic angles on each side of said plate at the back edge thereof, the flats of said fourth series of angles forming an obtuse angle with the corresponding side of said plate, (c) lightly fastening the second faces of a plurality of foam plastic blocks to said ribbands and inserting blocks between said flats of said first and second series of pairs of metallic angles, and between said flats of said third and fourth series of angles and corresponding sides of said plate, (d) rasping the opposing first faces of said blocks until the combined outline of said first faces of said blocks assumes the contour desired of said hull, (e) cementing at least one layer of overlapping metal strips to said first faces of said blocks and to said flats of said first and third series of angles, (f) removing said non-permanent portions of said mold, and (g) cementing at least one layer of overlapping metal strips to said second faces of said blocks and to said flats of said second and fourth series of angles.

4. A method for constructing a boat hull having a deck using a coarse inverted mold comprising non-permanent portions including wooden frames and ribbands that interconnect said frames along the longitudinal axis of said mold, and comprising permanent portions that remain with said hull including bulkheads, web frames transversing said longitudinal axis of said mold and a central plate in the stem section of said mold, said method comprising the steps of:

(a) attaching a first series of pairs of metallic angles along the bottom periphery and a second series of pairs of metallic angles just inside the bottom periphery of said bulkheads and webs, said first and second series of angles having flats extending outward from said bulkheads and webs, (b) attaching a third series of metallic angles on each side of the forward edge of said plate, the flats of said third series of angles forming V-shaped channels with each side of said plate, and attaching a fourth series of metallic angles on each side of said plate at the back edge thereof, the flats of said fourth series of angles forming an obtuse angle with the corresponding side of said plate, (c) lightly fastening the second faces of a plurality of foam plastic blocks to said ribbands, inserting blocks between said flats of said first and second series of angle pairs and between said flats of said third and fourth series of angles and corresponding sides of said plate, and applying higher density blocks where special core strength is needed, and forming a rim of higher density blocks at the level of said deck, (d) rasping the opposing first faces of said blocks until the combined outline of said first faces of said blocks assumes the contour desired of said hull, further rasping said first faces of said higher density blocks forming a slight depression therein, (e) cementing at least one layer of overlapping metal strips to said first faces of said blocks and to said flats of said first and third series of angles, applying thicker metal strips to said slightly depressed first faces of said higher density blocks, (f) removing said non-permanent portions of said mold, (g) rasping said second faces of said higher density blocks forming a slight depression therein, (h) cementing at least one layer of overlapping metal strips to said second faces of said blocks and to said flats of said second and fourth series of angles, applying thicker metal strips to said slightly depressed second faces of said higher density blocks, and (i) laying said deck, and securing the periphery of said deck to said rim of higher density blocks.

5. A method for constructing a boat hull having a deck using a coarse inverted mold comprising wooden frames transversing the longitudinal axis of said mold and ribbands extending across said frames along the length of said mold, comprising the steps of:

(a) lightly fastening the second faces of a plurality of foam plastic blocks to said ribbands, fastening higher density blocks to areas which will underly structurally supporting members and fastening higher density blocks to form a rim level with said deck, (b) rasping the opposing first faces of said blocks until the combined outline of said first block faces assumes the external contour desired of said hull, (c) cementing at least one layer of overlapping metal strips to said first faces of said blocks, (d) removing said mold, (e) cementing at least one inner layer of overlapping metal strips to said second faces of said blocks, (f) securing structurally supporting members of said inner layer of strips using screw fastened metallic angles to secure said members to said underlying higher density blocks, and (g) laying said deck, and securing the periphery of said deck to said rim of higher density blocks.

References Cited

UNITED STATES PATENTS

| | | | |
|---|---|---|---|
| 2,372,521 | 3/1945 | Sherman | 9—6.5 |
| 2,682,491 | 6/1954 | Hahn | 161—36 XR |
| 3,050,208 | 8/1962 | Irvine | 161—88 XR |
| 3,093,847 | 6/1963 | Strecker | 9—6 |
| 3,174,166 | 3/1965 | Ehrenberg et al. | 9—6 |

EARL M. BERGERT, Primary Examiner

H. F. EPSTEIN, Assistant Examiner

U.S. Cl. X.R.

161—161